Patented Jan. 31, 1939

2,145,464

UNITED STATES PATENT OFFICE 2,145,464

SYNTHETIC RESIN COATING COMPOSITIONS

Leo V. Steck, Piedmont, and Franklin A. Bent, Berkeley, Calif., assignors to Shell Development Company, San Francisco, Calif., a corporation of Delaware No Drawing. Application March 22, 1937, Serial No. 132,360

10 Claims. (Cl. 260—32)

The present invention deals with the solvation of lacquer or film forming organic compounds, preferably of high molecular weight, which are incompatible with cellulose ethers or esters; and is particularly concerned with the solvation of polymerides of vinyl compounds and the useful compositions of matter resulting therefrom.

For purposes of clarity only, further specific references will be made to the preferred class of compounds.

When vinyl compounds are polymerized to products of high molecular weight, the latter are difficultly soluble or insoluble in most of the conventional organic solvents at ordinary temperatures. As the more highly polymerized forms have excellent resistance to acids, alkalis, moisture and oils, they would be desirable for lacquers, finishes and surface coverings were it not for the above deficiency.

The high molecular polymerides inherently possess a considerable film strength, which makes them valuable without the aid of cellulose ethers and esters with which they are incompatible. Suitable modifiers may, however, be used with the polymerides when desirable, as for example, polyvinyl acetate films may be made more water stable and more weather resistant by the addition of plasticizers which are water repellent, such as the esters of phthalic and phosphoric acids.

We have found that unsaturated ketones, preferably those represented by the empirical formula $C_nH_{2n-2}O$, are excellent solvents for these polymerides which are not compatible with cellulose ethers and esters. Suitable unsaturated ketones are those which are normally liquid, such as: 2-methyl-pentene-2-one-4, 3-methyl-heptene-3-one-5, 2-methyl-butene-1-one-3, butene-1-one-3, pentene-2-one-4, their homologues, isomers, analogues and substitution products.

Although we do not confine ourselves to any specific mode of preparation, the unsaturated ketones may be obtained by the intermolecular condensation of ketones and dehydration of the condensation product. Alternatively, a ketone may be condensed and dehydrated in one step to form an unsaturated ketone. It is possible to prepare in this way a series of compounds having a wide range of evaporation rates and of other properties.

The following table illustrates the comparative superiority of unsaturated ketones over corresponding saturated ketones:

| Properties | 2-methyl-pentene-2-one-4 | Methyl isobutyl ketone |
|---|---|---|
| Flash point, °F | 84 | 63 |
| Boiling range, °C | 128–130 | 110.5–115.7 |
| Relative rate of evaporation (n. butyl acetate=1.00) | 0.90 | 1.45 |
| Dilution ratio at 8% final concentration "vinylite VYHH"— | | |
| With respect to toluene | 13.38 | 12.23 |
| With respect to petroleum hydrocarbons (boiling range 64.5–128.6° C.) | 1.04 | 0.69 |
| Resistance to 85% relative humidity at 80° C. | Superior to methyl isobutyl ketone. | Inferior to 2-methyl-pentene-2-one-1. |
| Viscosity of 20% "vinylite VYHH," seconds | 115 | 225 |
| Spray test at 20% "vinylite VYHH." | Smooth film. | Rough film. |

The table illustrates that the class of unsaturated ketones has a slower rate of evaporation than the corresponding saturated ketones; that the former has a greater tolerance for hydrocarbon diluents, making it possible to formulate cheaper lacquers; and that the films resulting from the former possess an excellent gloss and smoothness, while those of the latter are exceedingly rough and pitted. Similar differences are found on comparing the properties of other unsaturated ketones with the properties of the corresponding saturated ketones, for instance, 3-methyl-heptene-3-one-5 is a better solvent for vinylite compounds than is 3-methyl-heptane-one-5. It is thus evident that the compositions of our invention comprising solutions of higher polymerization products of vinyl compounds in unsaturated ketones are markedly superior lacquers to the saturated ketone solutions which are the best which have been evolved since polymerides of this type were first suggested in United States Patent 1,241,738 as evidenced by British Patent 450,856, complete accepted July 24, 1936.

Normal butyl acetate which is used in the lacquer industry because of its evaporation rate suffers by comparison with the unsaturated ketones; its dilution ratio with respect to toluene is 6.23; its initial viscosity is much greater than that of methyl isobutyl ketone—increasing with age and settling to a jelly (typical of aliphatic esters), and its dilution ratio with the aforementioned petroleum hydrocarbon mixture is 0.46.

The polymerides with which we are especially concerned are those derived from vinyl compounds such as vinyl chloride, vinyl bromide, vinyl acetate, vinyl propionate, vinyl benzene, divinyl benzene, vinyl acetylene, divinyl acetylene, vinyl ethers, vinyl chloracetate, vinyl trichloracetate, vinyl butyrate, acrylic acid, methacrylic acid, the esters of the various acrylic acids such as the methyl, ethyl, propyl, butyl, allyl and higher esters, their homologues, analogues and substitution products, whether as pure components or mixtures of polymerides from individual monomeric vinyl compounds or from mixtures of the latter, prepared either in the presence or absence of conventional addition agents. We therefore contemplate the use of conjoint polymers such as derived by the simultaneous polymerization of vinyl chloride and vinyl acetate. Polymerides of the above types may be either compatible or incompatible with cellulose ethers and esters depending upon the degree of polymerization. Low degrees of polymerization which result in compatible polymerides also produce films of poor strength and low resistance to acids and alkalies and are therefore not used in the lacquers of our invention.

The following examples illustrate typical lacquer formulations. The "vinylite VYHH" resin used is a polymerization product of vinyl chloride and vinyl acetate of medium average molecular weight containing 85 to 88 per cent vinyl chloride which is incompatible with cellulose nitrate solutions.

*Example I.—Clear base lacquer*

| Ingredient: | Per cent |
| --- | --- |
| "Vinylite VYHH" | 20 |
| 2-methyl-pentene-2-one-4 | 40 |
| Toluol | 32 |
| Xylol | 8 |

*Example II.—White pigmented lacquer*

| Ingredient: | Per cent |
| --- | --- |
| "Vinylite VYHH" | 20 |
| Titanium oxide | 10 |
| 2-methyl-pentene-2-one-4 | 26 |
| Methyl ethyl ketone | 7 |
| 1,7, dimethyl-pentadiene-2, 5-one-4 | 5 |
| Toluene | 25 |
| Xylene | 6 |

*Example III.—Clear lacquer*

| Ingredient: | Per cent |
| --- | --- |
| "Vinylite VYHH" | 20 |
| Methyl ethyl ketone | 8 |
| 2-methyl-pentene-2-one-4 | 32 |
| Toluol | 32 |
| Xylol | 8 |

The solutions obtained leave upon evaporation a tough, hard, clear and homogeneous film without the aid of cellulose ethers or esters. In this manner, one may obtain films of extremely satisfactory character without dependence on the mutual compatibility of the cellulose derivative and resin used.

The compositions may be applied by rollercoating, dipping, brushing, spraying, etc. They may be employed on metal, wood, paper, felt, stone, fabric, concrete plastic compositions, Transite board, etc. They may be employed as adhesives for laminated glass or to cause wood, paper, cardboard, asbestos board, etc., to adhere to glass, rubber, metal, wood, etc. They are well suited for lining food containers, beer cans, etc.

It is to be understood that applicants are to be entitled to a scope of equivalents in their claims which includes not only those classes and species enumerated in their specification, but also those organic compounds incompatible with cellulose ethers or esters which are capable of yielding films upon evaporation of the solvent solution containing one or more unsaturated ketones.

We claim as our invention:

1. A liquid coating composition comprising a film forming polymeride of a vinyl compound which forms a tough acid and alkali resistant homogeneous film without cellulose ethers or esters on evaporation of its solutions and which forms a gel in normal butyl acetate solution, dissolved in a solution containing a normally liquid aliphatic ketone having an alkenyl radical directly attached to the carbonyl carbon atom.

2. A composition of matter comprising a polymeride of a vinyl compound which polymeride forms a tough acid and alkali resistant homogeneous film without cellulose ethers or esters on evaporation of its solutions and which forms a gel in normal butyl acetate solution and an aliphatic ketone having not more than 8 carbon atoms and an alkylidine radical in the molecule as a solvent therefor.

3. A composition of matter comprising a polymeride of a vinyl compound which polymeride forms a tough acid and alkali resistant homogeneous film without cellulose ethers or esters on evaporation of its solutions and which forms a gel in normal butyl acetate solution and a ketone of the group consisting of 2-methyl-pentene-2-one-4, 3-methyl-heptene-3-one-5, 2-methyl-butene-1-one-3, butene-1-one-3 and pentene-2-one-4 as a solvent therefor.

4. A composition of matter comprising a polymeride of a vinyl compound which polymeride forms a tough acid and alkali resistant homogeneous film without cellulose ethers or esters on evaporation of its solutions and which forms a gel in normal butyl acetate solution and 2-methyl-pentene-2-one-4 as a solvent therefor.

5. A composition of matter comprising a polymeride of a vinyl halide which polymeride forms a tough acid and alkali resistant homogeneous film without cellulose ethers or esters on evaporation of its solutions and which forms a gel in normal butyl acetate solution, dissolved in a solution containing a normally liquid aliphatic ketone having an alkenyl radical directly attached to the carbonyl carbon atom.

6. A composition of matter comprising a polymeride of a vinyl ester which polymeride forms a tough acid and alkali resistant homogeneous film without cellulose ethers or esters on evaporation of its solutions and which forms a gel in normal butyl acetate solution, dissolved in a solution containing a normally liquid aliphatic ketone having an alkenyl radical directly attached to the carbonyl carbon atom.

7. A composition of matter comprising a polymeride of a mixture of different vinyl compounds which polymeride forms a tough acid and alkali resistant homogeneous film without cellulose ethers or esters on evaporation of its solutions and which forms a gel in normal butyl acetate solution, dissolved in a solution containing a normally liquid aliphatic ketone having an alkenyl radical directly attached to the carbonyl carbon atom.

8. A composition of matter comprising "vinylite VYHH" and a normally liquid aliphatic ketone having an alkenyl radical directly attached to the carbonyl carbon atom.

9. An article having thereon a film derived from a liquid coating composition defined in claim 1.

10. An article having thereon a film derived from a liquid coating composition containing a polymeride of a vinyl compound, which polymeride forms a tough acid and alkali resistant homogeneous film without cellulose ethers or esters on evaporation of its solutions and which forms a gel in normal butyl acetate solution and 2-methyl-pentene-2-one-4.

LEO V. STECK.
FRANKLIN A. BENT.